(12) United States Patent
Zhao

(10) Patent No.: US 10,009,205 B2
(45) Date of Patent: Jun. 26, 2018

(54) CANCELLATION PULSE GENERATOR SCHEDULING METHOD AND SYSTEM

(71) Applicants: ZTE Corporation, Shenzhen (CN); ZTE MICROELECTRONICS TECHNOLOGY CO., LTD, Shenzhen (CN)

(72) Inventor: Xingshan Zhao, Shenzhen (CN)

(73) Assignees: ZTE CORPORATION, Shenzhen (CN); ZTE MICROELECTRONICS TECHNOLOGY CO., LTD, Shenzhen (CN)

(*) Notice: Subject to any disclaimer, the term of this patent is extended or adjusted under 35 U.S.C. 154(b) by 87 days.

(21) Appl. No.: 15/022,431

(22) PCT Filed: May 12, 2014

(86) PCT No.: PCT/CN2014/077307
§ 371 (c)(1),
(2) Date: Aug. 18, 2016

(87) PCT Pub. No.: WO2014/183627
PCT Pub. Date: Nov. 20, 2014

(65) Prior Publication Data
US 2017/0026216 A1    Jan. 26, 2017

(30) Foreign Application Priority Data

Sep. 16, 2013  (CN) .......................... 2013 1 0423268

(51) Int. Cl.
*H04L 27/26* (2006.01)
*H04L 5/00* (2006.01)

(52) U.S. Cl.
CPC .......... *H04L 27/2614* (2013.01); *H04L 5/005* (2013.01); *H04L 27/2623* (2013.01)

(58) Field of Classification Search
None
See application file for complete search history.

(56) References Cited

U.S. PATENT DOCUMENTS 6,480,525 B1 * 11/2002 Parsa .................... H04B 1/707
                                                    370/342
7,409,009 B2 * 8/2008 Akhtman ............ H04L 27/2624
                                                    375/296
(Continued)

FOREIGN PATENT DOCUMENTS

CN        1946217 A      4/2007
CN      102170416 A      8/2011

OTHER PUBLICATIONS

European Search Report for corresponding application EP 14 79 8209; Report dated Jan. 18, 2017.
(Continued)

*Primary Examiner* — Gregory B Sefcheck
(74) *Attorney, Agent, or Firm* — Cantor Colburn LLP

(57) ABSTRACT

Provided a CPG scheduling method and system. The method includes that: peak cancellation components generate and send a CPG calling request to a CPG scheduling component; the CPG scheduling component configures at least one CPG to the peak cancellation component corresponding to the CPG calling request from a CPG sharing resource pool to generate at least one cancellation pulse according to a scheduling strategy and the CPG calling request; and the CPG scheduling component receives the at least one cancellation pulse generated by the at least one configured CPG according to the CPG calling request, and transmits the at least one cancellation pulse to the peak cancellation components corresponding to the CPG calling request to implement peak cancellation processing. By implementing the present disclosure, the problem of incapability in accom-
(Continued)

plishing all peak cancellation tasks of a peak cancellation component of a certain stage in the related art is solved.

18 Claims, 8 Drawing Sheets

(56) References Cited

U.S. PATENT DOCUMENTS

| | | | | |
|---|---|---|---|---|
| 7,729,380 B2* | 6/2010 | Wiatrowski | .......... | H04L 1/0045 370/464 |
| 7,995,975 B2* | 8/2011 | Sundstrom | .......... | H04L 27/2624 455/116 |
| 8,150,338 B2* | 4/2012 | Sundstrom | .......... | H04L 27/2624 455/116 |
| 8,599,961 B2* | 12/2013 | Schmidt | .............. | H04L 27/2624 375/296 |
| 8,619,903 B2* | 12/2013 | Schmidt | .............. | H04L 27/2624 375/296 |
| 8,744,002 B2* | 6/2014 | Maehata | ............. | H04L 27/2624 375/260 |
| 8,787,495 B2* | 7/2014 | Maehata | ............. | H04J 11/0023 375/297 |
| 8,861,304 B1* | 10/2014 | Cope | ........................ | G11C 7/22 365/189.09 |
| 8,937,993 B2* | 1/2015 | Yu | ....................... | H04L 27/2624 375/232 |
| 9,077,408 B1* | 7/2015 | Sapuan Sahori | .... | H04B 1/0475 |
| 9,100,253 B2* | 8/2015 | Mundarath | ......... | H04L 27/2624 |
| 9,363,113 B2* | 6/2016 | Pavel | .................. | H04L 27/2623 |

OTHER PUBLICATIONS

Texas Instruments Inc USA, "Crest Factor Reduction Processor", Internet Citation, URL: http://tw.ic-on-line.cn/IOL/datasheet/gc1115_319962.pdf, Feb. 1, 2005, pp. 1-80, XP002522489.
International Search Report for corresponding application No. PCT/CN2014/077307 filed on May 12, 2014; dated Aug. 8, 2014.

* cited by examiner

CANCELLATION PULSE GENERATOR SCHEDULING METHOD AND SYSTEM

TECHNICAL FIELD

The present disclosure relates to the field of communication, and in particular to a Cancellation Pulse Generator (CPG) scheduling method and system for scheduling CPGs in a digital intermediate-frequency processing system.

BACKGROUND

A Software Defined Radio (SDR) technology is an emerging technology in the field of wireless communication, and along with development of the SDR technology, hardware implementation manners of digital intermediate-frequency processing rise. A peak cancellation technology is one of core functions of digital intermediate-frequency processing, and is favourable for reducing a peak-to-average ratio of a signal. At present, a common peak cancellation algorithm is a Peak Cancel-Crest Factor Reduction (PC-CFR) algorithm.

As shown in FIG. 1, a hardware device for implementing a PC-CFR algorithm usually adopts a cascading manner of multistage peak cancellation components at present, wherein a peak cancellation component of each stage is configured with a fixed number of CPGs to process a fixed number of peak cancellation tasks, peak cancellation processing structures of the next stages continue processing remaining peak cancellation tasks, and peak cancellation data is output after a few continuous stages of peak cancellation processing; and as shown in FIG. 2, an existing peak cancellation component usually includes components with functions as follows: peak detection, peak searching window, peak scheduling, peak pulse calculation and processing, CPG processing and the like, wherein the CPG component includes CPG1, CPG2, . . . and CPGn, wherein n is the number of CPGs configured for the peak cancellation component of each stage, wherein the number of the CPGs already set determines the maximum number of peaks which may be processed by the peak cancellation component of the stage.

In peak cancellation components of multiple stages, each peak cancellation component may configure a different threshold for peak searching, and generally, threshold configuration value of the peak cancellation component of previous stage is higher than the threshold configuration value of the next stage, that is, the peak cancellation component of the previous stage preferentially process a high peak, and low peaks are processed by the peak cancellation components of the next stages. CPGs are exclusively shared by the peak cancellation component of each stage, and the following conditions may appear during peak searching:

the number of peaks detected in the peak cancellation component of some stages is smaller than the number of CPGs of the stages, which may cause waste of the CPGs; while the number of peaks detected in the peak cancellation components of some stages exceed the number of CPGs of the stages, which may cause incapability in processing peaks required to be processed by the peak cancellation components of the stages due to insufficient CPGs.

Therefore, how to provide a method capable of solving the problem of incapability in completely processing peaks due to insufficient CPGs is a technical problem urgent to be solved by those skilled in the art.

SUMMARY

The present disclosure provides a CPG scheduling method and system, which solve the problem of incapability in accomplishing all peak cancellation tasks of a peak cancellation component of a certain stage when the number of CPGs in the peak cancellation component is smaller than the number of peaks required to be processed by the peak cancellation component in a related art.

According to an aspect of the embodiment of the present disclosure, a Cancellation Pulse Generator (CPG) scheduling method is provided, applied to a CPG scheduling system, the CPG scheduling system comprising at least two peak cancellation components, a CPG scheduling component and a CPG sharing resource pool, the CPG sharing resource pool comprising at least one CPG, the CPG scheduling method comprising: generating and sending, by the peak cancellation component, a CPG calling request to the CPG scheduling component; configuring from the CPG sharing resource pool, according to a scheduling strategy and the CPG calling request, by the CPG scheduling component, at least one CPG for the peak cancellation component corresponding to the CPG calling request, to generate at least one cancellation pulse; and receiving, by the CPG scheduling component, the at least one cancellation pulse generated by the at least one configured CPG according to the CPG calling request, and transmitting the at least one cancellation pulse to the peak cancellation component corresponding to the CPG calling request to implement peak cancellation processing.

In an example embodiment of the present disclosure, when the scheduling strategy is a priority scheduling strategy, before configuring, by the CPG scheduling component, the at least one CPG for the peak cancellation component corresponding to the CPG calling request, further comprising: setting, by the CPG scheduling component, a scheduling priority for each peak cancellation component, wherein configuring, by the CPG scheduling component, the at least one CPG for the peak cancellation component comprises: when two or more CPG calling requests are received, detecting the scheduling priority of each peak cancellation component, and preferentially configuring the at least one CPG for the peak cancellation component with a higher priority.

In an example embodiment of the present disclosure, when the scheduling strategy is a strategy of limiting a maximum resource configuration in a single-stage, before configuring, by the CPG scheduling component, the at least one CPG for the peak cancellation component corresponding to the CPG calling request, further comprising: setting, by the CPG scheduling component, a maximum configuration number for each peak cancellation component, wherein configuring, by the CPG scheduling component, the at least one CPG for the peak cancellation component comprises: when the CPG calling request is received, judging whether the number of the at least one CPG configured for the peak cancellation component corresponding to the CPG calling request reaches the maximum configuration number or not, not configuring the at least one CPG when a judging result is that the number of the at least one CPG configured for the peak cancellation component corresponding to the CPG calling request reaches the maximum configuration number, and configuring the at least one CPG when the judging result is that the number of the at least one CPG configured for the peak cancellation component corresponding to the CPG calling request does not reach the maximum configuration number.

In an example embodiment of the present disclosure, further comprising: setting, by the CPG scheduling component, a flag bit for each CPG in the CPG sharing resource pool, the flag bit being configured to record whether the corresponding CPG is in an idle state or not, wherein configuring, by the CPG scheduling component, the at least one CPG for the peak cancellation component comprises: searching and configuring the at least one CPG in the idle state for the peak cancellation component, and updating a state of the at least one configured CPG into a non-idle state.

In an example embodiment of the present disclosure, after the at least one cancellation pulse generated by the at least one configured CPG is received and before the at least one cancellation pulse is transmitted to the peak cancellation component, further comprising: synthesizing, by the CPG scheduling component, the at least one received cancellation pulse, wherein transmitting the at least one cancellation pulse to the peak cancellation component comprises: transmitting a new cancellation pulse formed by synthesis to the peak cancellation component.

In an example embodiment of the present disclosure, when there are no CPGs set in the peak cancellation component, generating, by the peak cancellation component, the CPG calling request comprises: generating the CPG calling request according to the number of peaks required to be processed by the peak cancellation component, wherein the CPG calling request carries information of the number of the peaks required to be processed by the peak cancellation component and a peak parameter of each peak; configuring, by the CPG scheduling component, the at least one CPG for the peak cancellation component comprises: configuring the at least one CPG for the peak cancellation component, wherein the number of the at least one configured CPG is the same as the number of the peaks carried in the CPG calling request; respectively transmitting the peak parameter of each peak to each configured CPG; and generating, by the each configured CPG, the at least one cancellation pulse according to the respectively received peak parameter; when there is at least one CPG set in the peak cancellation component, generating, by the peak cancellation component, the CPG calling request comprises: judging whether to generate the CPG calling request or not according to the number of the peaks required to be processed by the peak cancellation component and the number of the CPGs already set in the peak cancellation component, and when the number of the peaks required to be processed by the peak cancellation component is larger than the number of the CPGs already set in the peak cancellation component, generating the CPG calling request, the CPG calling request comprising information of a difference between the number of the peaks required to be processed by the peak cancellation component and the number of the CPGs already set in the peak cancellation component and the peak parameter of each redundant peak corresponding to the difference; and configuring, by the CPG scheduling component, the at least one CPG for the peak cancellation component comprises: configuring the at least one CPG for the peak cancellation component, wherein the number of the at least one configured CPG is the same as the number of the difference carried in the CPG calling request; transmitting the peak parameter of each redundant peak corresponding to the difference to each configured CPG respectively; generating, by the each configured CPG, the at least one cancellation pulse according to the respectively received peak parameter; and simultaneously generating, by the CPGs already set in the peak cancellation component, at least one cancellation pulse according to the peak parameter of each remaining peak respectively.

According to another aspect of the embodiment of the present disclosure, a Cancellation Pulse Generator (CPG) scheduling system is provided, comprising at least two peak cancellation components, a CPG scheduling component and a CPG sharing resource pool, the CPG sharing resource pool comprising at least one CPG, wherein the peak cancellation component is configured to generate and send a CPG calling request to the CPG scheduling component; the CPG scheduling component is configured to configure from the CPG sharing resource pool, according to a scheduling strategy and the CPG calling request, at least one CPG for the peak cancellation component corresponding to the CPG calling request to generate at least one cancellation pulse; and is further be configured to receive the at least one cancellation pulse generated by the at least one configured CPG according to the CPG calling request, and transmit the at least one cancellation pulse to the peak cancellation component corresponding to the CPG calling request to implement peak cancellation processing; and the at least one CPG in the CPG sharing resource pool is configured to generate the at least one cancellation pulse according to the CPG calling request, and transmit the at least one cancellation pulse to the CPG scheduling component.

In an example embodiment of the present disclosure, the CPG scheduling component is further configured to, when the scheduling strategy is a priority scheduling strategy, before configuring the at least one CPG for the peak cancellation component corresponding to the CPG calling request, set a scheduling priority for each peak cancellation component; and the CPG scheduling component is configured to, when configuring the at least one CPG for the peak cancellation component, and receiving two or more CPG calling requests, detect the scheduling priority of each peak cancellation component, and preferentially configure the at least one CPG for the peak cancellation component with a higher priority.

In an example embodiment of the present disclosure, the CPG scheduling component is further configured to, when the scheduling strategy is a strategy of limiting a maximum resource configuration in a single-stage, before configuring the at least one CPG for the peak cancellation component corresponding to the CPG calling request, set a maximum configuration number for each peak cancellation component; and the CPG scheduling component is configured to, when configuring the at least one CPG for the peak cancellation component, and receiving the CPG calling request, judge whether the number of the at least one CPG configured for the peak cancellation component corresponding to the CPG calling request reaches the maximum configuration number or not, not configure the at least one CPGs when a judging result is that the number of the at least one CPG configured for the peak cancellation component corresponding to the CPG calling request reaches the maximum configuration number, and configure the at least one CPG when the judging result is that the number of the at least one CPG configured for the peak cancellation component corresponding to the CPG calling request does not reach the maximum configuration number.

In an example embodiment of the present disclosure, the CPG scheduling component is further configured to set a flag bit for each CPG in the CPG sharing resource pool, the flag bit being configured to record whether the corresponding CPG is in an idle state or not; and the CPG scheduling component is configured to, when configuring the at least one CPG for the peak cancellation component, search and configure the at least one CPG in the idle state for the peak cancellation component, and update a state of the at least one configured CPG into a non-idle state.

In an example embodiment of the present disclosure, the CPG scheduling component is further configured to, after receiving the at least one cancellation pulse generated by the at least one configured CPGs and before transmitting the at least one cancellation pulses to the peak cancellation component, synthesize the at least one received cancellation pulse; and the CPG scheduling component is configured to, when transmitting the at least one cancellation pulse to the peak cancellation component, transmit a new cancellation pulse formed by synthesis to the peak cancellation component.

In an example embodiment of the present disclosure, the peak cancellation component is configured to, when there are no CPGs set in the peak cancellation component, and generating the CPG calling request, generate the CPG calling request according to the number of peaks required to be processed by the peak cancellation component, wherein the CPG calling request carries information of the number of the peaks required to be processed by the peak cancellation component and a peak parameter of each peak; the CPG scheduling component, when configuring the at least one CPG for the peak cancellation components, is configured to configure the at least one CPG for the peak cancellation component, wherein the number of the at least one configured CPG is the same as the number of the peaks carried in the CPG calling request; and respectively transmit the peak parameter of each peak to each configured CPG; wherein the each configured CPG generates the at least one cancellation pulse according to the respectively received peak parameter; the peak cancellation component is configured to, when there is at least one CPG in the peak cancellation component, and generating the CPG calling request, judge whether to generate the CPG calling request or not according to the number of the peaks required to be processed by the peak cancellation component and the number of the CPGs already set in the peak cancellation component, and when the number of the peaks required to be processed by the peak cancellation component is larger than the number of the CPGs already set in the peak cancellation component, generate the CPG calling request, the CPG calling request comprising information of a difference between the number of the peaks required to be processed by the peak cancellation component and the number of the CPGs already set in the peak cancellation component and the peak parameter of each redundant peak corresponding to the difference; and the CPG scheduling component, when configuring the at least one CPG for the peak cancellation component, is configured to configure the at least one CPG for the peak cancellation component, wherein the number of the at least one configured CPG is the same as the number of the difference carried in the CPG calling request, and transmit the peak parameter of each redundant peak corresponding to the difference to each configured CPG respectively; wherein the each configured CPG generates the at least one cancellation pulse according to the respectively received peak parameter, and the CPGs set in the peak cancellation component simultaneously generate at least one cancellation pulse according to the peak parameter of each remaining peak respectively.

The present disclosure brings beneficial effects as follows: according to the CPG scheduling method and system provided by the present disclosure, the CPG sharing resource pool is set, and the CPG scheduling component configures from the CPG sharing resource pool the CPGs for the peak cancellation component when receiving a CPG calling request generated by the peak cancellation component, so that requirement of the peak cancellation component on the CPGs are met, the peak cancellation component may maximally accomplish peak cancellation tasks required to be processed, and the problem of incapability in accomplishing all peak cancellation tasks of a peak cancellation component of a certain stage when the number of CPGs in the peak cancellation component is smaller than the number of peaks required to be processed by the peak cancellation component in the related art is solved; and furthermore, the scheduling strategy is set in the present disclosure, different CPG schedulings are executed under different scheduling strategies, and for example, the CPGs may be preferentially configured to the peak cancellation component with a higher priority, so that the peak cancellation component with the higher priority may accomplish corresponding peak cancellation tasks required to be processed.

DETAILED DESCRIPTION OF THE EMBODIMENTS

The present disclosure will now be further interpreted and described by specific implementation modes with reference to the drawings.

Figure 3:
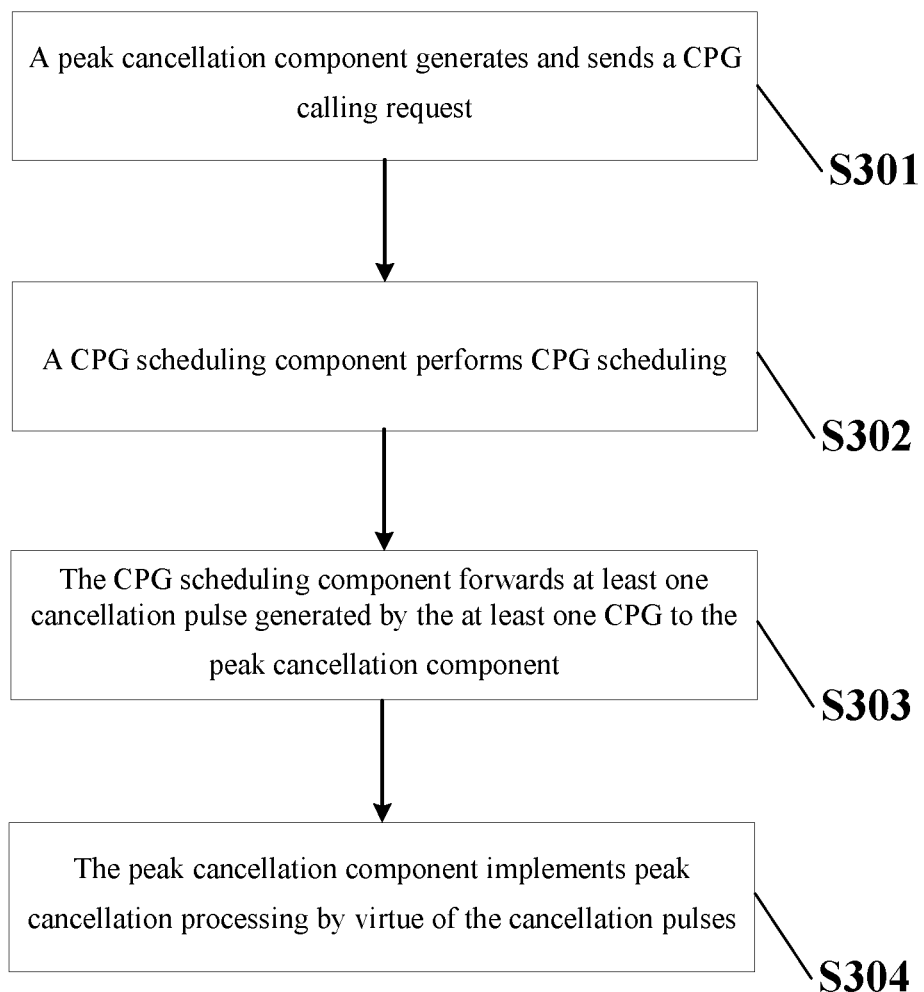
FIG. 3 is a diagram of a CPG scheduling method provided by a first embodiment of the present disclosure.

FIG. 3 is a diagram of a CPG scheduling method provided by a first embodiment of the present disclosure, and as shown in FIG. 3, in the embodiment, the CPG scheduling method provided by the present disclosure includes the following steps.

Step 301: a peak cancellation component generates and sends a CPG calling request.

Wherein, when there are no CPGs set in the peak cancellation component, the step that the peak cancellation component generates the CPG calling request includes that: the CPG calling request is generated according to the number of corresponding peaks required to be processed, wherein the CPG calling request carries information of the number of the peaks required to be processed by the peak cancellation component and a peak parameter of each peak;

when there is at least one CPG in the peak cancellation component, the step that the peak cancellation component generates the CPG calling request includes that: whether to generate the CPG calling request or not is judged according to the number of the corresponding peaks required to be processed and the number of the CPGs in the peak cancellation component, and when the number of the corresponding peaks required to be processed is larger than the number of the CPGs in the peak cancellation component, the CPG calling request is generated, wherein the CPG calling request carries information of a difference between the number of the peaks required to be processed by the peak cancellation component and the number of the CPGs in the peak cancellation component and the peak parameters of each redundant peak.

Step 302: a CPG scheduling component performs CPG scheduling.

For example, the CPG scheduling component configures at least one CPG to the peak cancellation component corresponding to the CPG calling request from the CPG sharing resource pool according to a scheduling strategy and the CPG calling request, and the at least one configured CPG generates at least one cancellation pulse required by the peak cancellation component.

Wherein, when the scheduling strategy is a priority scheduling strategy, before the step that the CPG scheduling component configures the at least one CPG to the peak cancellation component corresponding to the CPG calling request, the method further includes that: the CPG scheduling component sets a scheduling priority for each peak cancellation component; and the step that the CPG scheduling component configures the at least one CPG to the peak cancellation component includes that: when at least two CPGs calling requests are received, the scheduling priority of each peak cancellation component is detected, and at least one CPG is preferentially configured for the peak cancellation component with a higher priority.

When the scheduling strategy is a strategy of limiting a maximum resource configuration in a single-stage, before the step that the CPG scheduling component configures the at least one CPG for the peak cancellation component corresponding to the CPG calling request, the method further includes that: the CPG scheduling component sets a maximum configuration number for each peak cancellation component; the step that the CPG scheduling component configures the at least one CPG for the peak cancellation component includes that: when the CPG calling request is received, whether the number of the at least one CPG configured for the peak cancellation component corresponding to the CPG calling request reaches the maximum configuration number or not is judged, the at least one CPG is not configured when a judging result is that the number of the at least one CPG configured for the peak cancellation component corresponding to the CPG calling request reaches the maximum configuration number, otherwise the at least one CPG is configured when the judging result is that the number of the at least one CPG configured for the peak cancellation component corresponding to the CPG calling request does not reach the maximum configuration number;

when there are no CPGs set in the peak cancellation component, the step that the CPG scheduling component configures the at least one CPG for the peak cancellation component includes that: CPGs in number the same as the number of the peaks carrying in the CPG calling request are configured for the peak cancellation component, the peak parameter of each peak is transmitted to each configured CPG, and the each configured CPG respectively generates at least one cancellation pulse according to received peak parameter; and when there is at least one CPG in the peak cancellation component, the step that the CPG scheduling component configures the at least one CPG for the peak cancellation component includes that: CPGs in number the same as the difference carrying in the CPG calling request are configured for the peak cancellation component, the peak parameter of each redundant peak is transmitted to each configured CPG respectively, the each configured CPG respectively generates at least one cancellation pulse according to own received peak parameter, and the CPGs set in the peak cancellation component simultaneously generate at least one cancellation pulse according to the peak parameter of each peak respectively.

Step 303: the CPG scheduling component forwards the at least one cancellation pulse generated by the CPG to the peak cancellation component.

The following processing may be adopted for the step: the CPG scheduling component receives the at least one cancellation pulse generated by the at least one configured CPG according to the CPG calling request, and transmits the at least one cancellation pulse to the peak cancellation component corresponding to the CPG calling request, wherein, after the CPG scheduling component receives the at least one cancellation pulse generated by the at least one configured CPG and before the CPG scheduling component transmits the at least one cancellation pulse to the peak cancellation component, the method further includes that: the CPG scheduling component synthesizes the at least one received cancellation pulse; and the step that the at least one cancellation pulse is transmitted to the peak cancellation component is specifically implemented as follows: a new cancellation pulse formed by synthesis is transmitted to the peak cancellation component.

Step 304: the peak cancellation component implements peak cancellation processing by virtue of the at least one cancellation pulse.

Wherein, when there are no CPGs set in the peak cancellation component, the step that the peak cancellation component implements peak cancellation processing by virtue of the at least one cancellation pulse is specifically implemented as follows: all the cancellation pulses returned by the CPG scheduling component are received, and these cancellation pulses are utilized to implement peak cancellation processing; and wherein, when there is at least one CPG in the peak cancellation component, the step that the peak cancellation component implements peak cancellation processing by virtue of the at least one cancellation pulse is specifically implemented as follows: all the cancellation pulses returned by the CPG scheduling component are received, and are matched with all cancellation pulses generated by the CPGs set in the peak cancellation component, and these cancellation pulses are utilized to implement peak cancellation processing.

Figure 4:
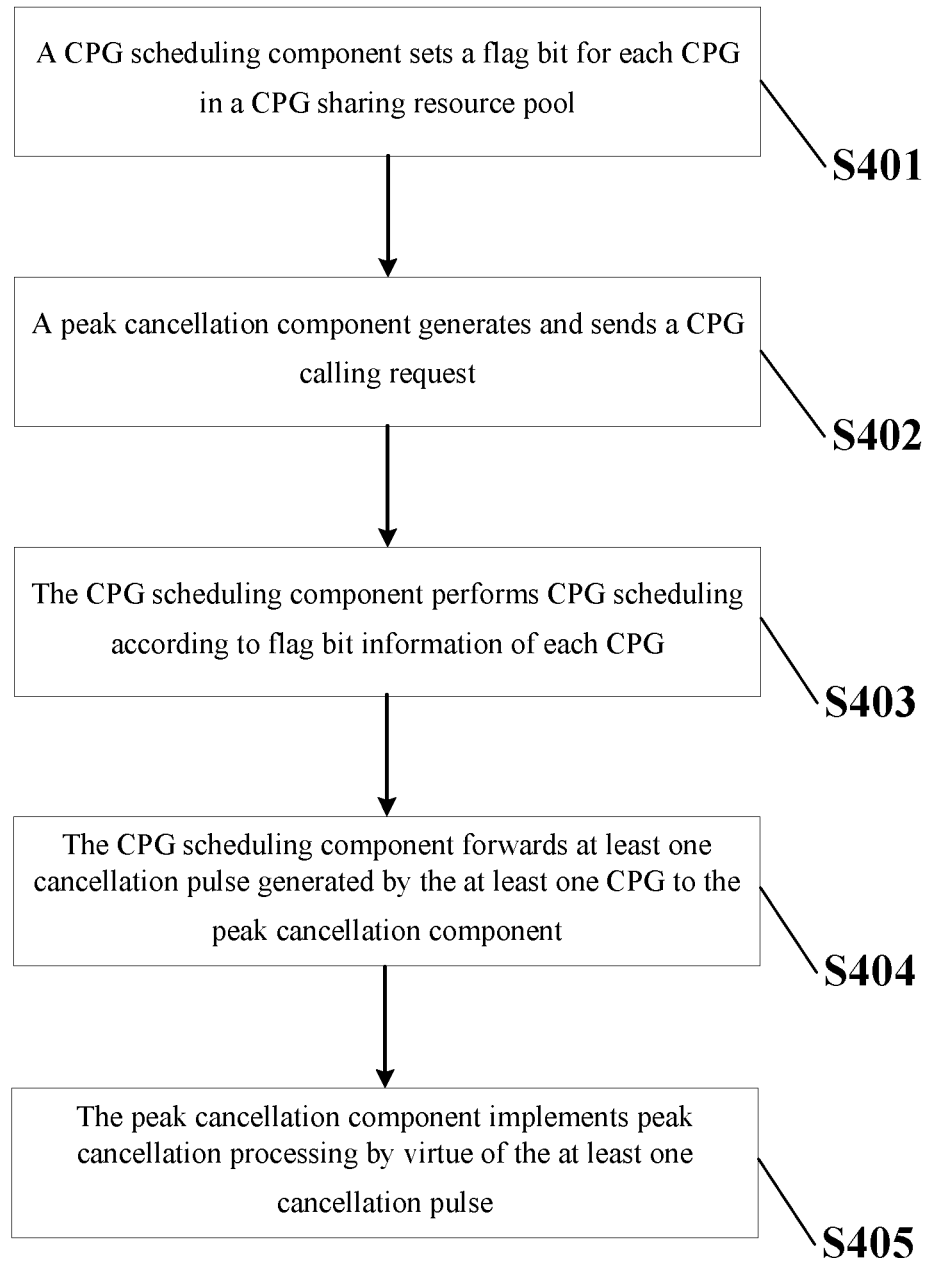
FIG. 4 is a diagram of a CPG scheduling method provided by a second embodiment of the present disclosure.

FIG. 4 is a diagram of a CPG scheduling method provided by a second embodiment of the present disclosure, and as shown in FIG. 4, in the embodiment, the CPG scheduling method provided by the present disclosure includes the following steps.

Step 401: a CPG scheduling component sets a flag bit for each CPG in a CPG sharing resource pool, wherein the flag bit used for recording whether a corresponding CPG is in an idle state or not.

Step 402: a peak cancellation component generates and sends a CPG calling request, wherein the step is similar to Step 301 in FIG. 3, and will not be elaborated.

Step 403: the CPG scheduling component performs CPG scheduling according to flag bit information of each CPG.

Wherein, the CPG scheduling component searches the CPG sharing resource pool and configures at least one CPG in the idle state for the peak cancellation component according to the scheduling strategy and the CPG calling request, and updates the state of the configured CPG into a non-idle state, so as to avoid the CPGs being repeatedly called.

Step 404: the CPG scheduling component forwards the at least one cancellation pulse generated by the at least one CPG for the peak cancellation component, wherein the step is similar to Step 303 in FIG. 3, and will not be elaborated.

Step 405: the peak cancellation component implements peak cancellation processing by virtue of the at least one cancellation pulse, wherein the step is similar to Step 304 in FIG. 3, and will not be elaborated.

Figure 5:
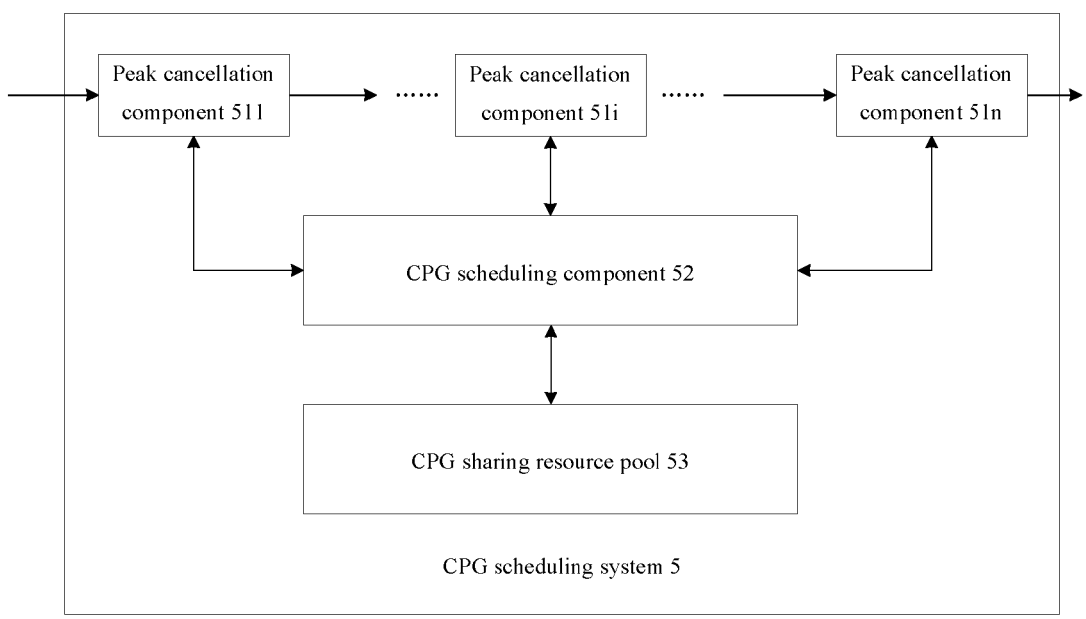
FIG. 5 is a diagram of a CPG scheduling system provided by a third embodiment of the present disclosure.

FIG. 5 is a diagram of a CPG scheduling system provided by a third embodiment of the present disclosure, and as shown in FIG. 5, in the embodiment, the CPG scheduling system 5 provided by the present disclosure includes: at least one peak cancellation component 51 (such as peak cancellation components 511, 512, . . . and 51n in FIG. 5), a CPG scheduling component 52 and a CPG sharing resource pool 53, the CPG sharing resource pool including at least one CPG, wherein the peak cancellation components 51 are configured to generate and send CPG calling requests to the CPG scheduling component 52;

the CPG scheduling component 52 is configured to configure CPGs for the peak cancellation components corresponding to the CPG calling requests from the CPG sharing resource pool 53 to generate cancellation pulses according to a scheduling strategy and the CPG calling requests, and is further configured to receive the cancellation pulses generated by the configured CPGs according to the CPG calling requests, and transmit the cancellation pulses to the peak cancellation components corresponding to the CPG calling requests to implement peak cancellation processing; and the CPGs in the CPG sharing resource pool 53 are configured to generate the cancellation pulses according to the CPG calling requests, and transmit the cancellation pulses to the CPG scheduling component.

Wherein, in another embodiment, when the scheduling strategy is a priority scheduling strategy, the CPG scheduling component 52 in FIG. 5 is further configured to, before configuring the CPGs to the peak cancellation components corresponding to the CPG calling requests, set a scheduling priority for each peak cancellation component; and when configuring the CPGs for the peak cancellation components, the CPG scheduling component is configured to, when receiving two or more CPG calling requests, detect the scheduling priority of each peak cancellation component, and preferentially configure the CPGs to the peak cancellation components with a higher priority.

In another embodiment, when the scheduling strategy is a strategy of limiting a maximum resource configuration in a single-stage, the CPG scheduling component 52 is further configured to, before configuring the CPGs to the peak cancellation components corresponding to the CPG calling requests, set a maximum configuration number for each peak cancellation component; and when configuring the CPGs to the peak cancellation components, the CPG scheduling component 52 is configured to, when receiving the CPG calling requests, judge whether the CPGs configured to the peak cancellation components corresponding to the CPG calling requests reaches the maximum configuration number or not, not configure the CPGs when the CPGs configured to the peak cancellation components corresponding to the CPG calling requests reaches the maximum configuration number, otherwise configure the CPGs when the CPGs configured to the peak cancellation components corresponding to the CPG calling requests does not reach the maximum configuration number.

Wherein, in another embodiment, the CPG scheduling component 52 is further configured to set a flag bit for each CPG in the CPG sharing resource pool, the flag bit being configured to record whether the corresponding CPGs are in an idle state or not; and when configuring the CPGs for the peak cancellation components, the CPG scheduling component 52 is configured to search and configure CPGs in the idle state for the peak cancellation components, and update the state of the configured CPGs into a non-idle state.

In another embodiment, after receiving the cancellation pulses generated by the configured CPGs and before transmitting the cancellation pulses to the peak cancellation components 51, the CPG scheduling component 52 is further configured to synthesize the received cancellation pulses; and when transmitting the cancellation pulses to the peak cancellation components 51, the CPG scheduling component 52 is configured to transmit a new cancellation pulse formed by synthesis to the peak cancellation components.

In another embodiment, when there are no CPGs set in the peak cancellation components 51, the peak cancellation components 51, when generating the CPG calling requests, are configured to generate the CPG calling requests according to the number of corresponding peaks required to be processed, the CPG calling requests carrying information about the number of the peaks required to be processed by the peak cancellation components and peak parameters of each peak; the CPG scheduling component 52, when configuring the CPGs to the peak cancellation components, is configured to configure CPGs in number the same as the number of the peaks in the CPG calling requests to the peak cancellation components, and transmit the peak parameters of each peak to each configured CPG, and each configured CPG generates the cancellation pulses according to own received peak parameters;

when there is at least one CPG in the peak cancellation components 51, when generating the CPG calling requests, the peak cancellation components 51 are configured to judge whether to generate the CPG calling requests or not according to the number of the corresponding peaks required to be processed and the number of the CPGs in the peak cancellation components, and when the number of the corresponding peaks required to be processed is larger than the number of the CPGs in the peak cancellation components, generate the CPG calling requests, the CPG calling requests carrying information about difference between the number of the peaks required to be processed by the peak cancellation components and the number of the CPGs in the peak cancellation components and the peak parameters of each redundant peak; and the CPG scheduling component 52, when configuring the CPGs to the peak cancellation components, is configured to configure CPGs in number the same as the difference in the CPG calling requests to the peak cancellation components 51, and transmit the peak parameter of each redundant peak to each configured CPG respectively, each configured CPG generates cancellation pulses according to own received peak parameters, and the CPGs set in the peak cancellation components simultaneously generate cancellation pulses according to the peak parameters of each peak respectively.

Figure 6:
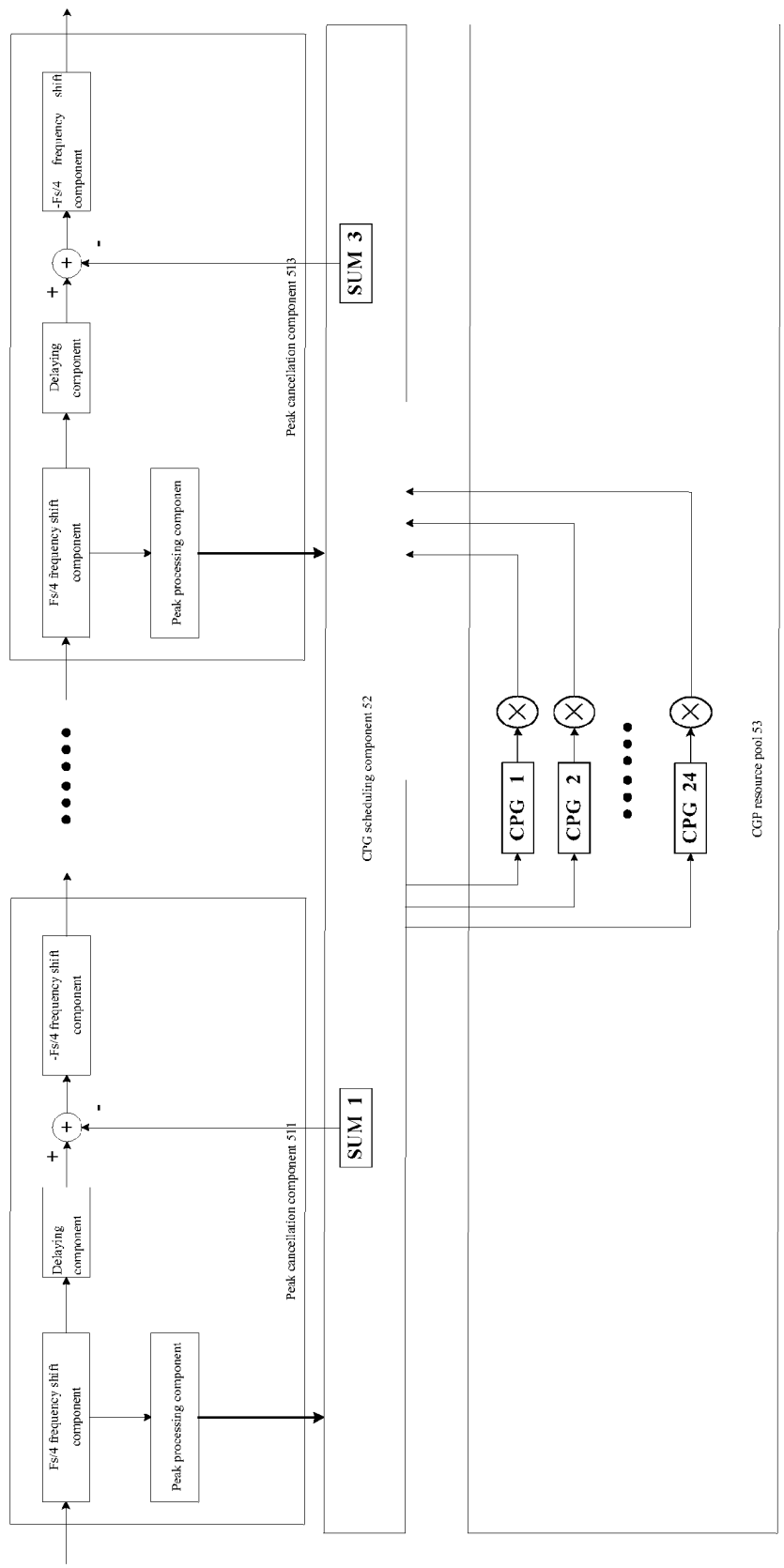
FIG. 6 is a structure diagram of a CPG scheduling system provided by a fourth embodiment of the present disclosure.
Figure 8:
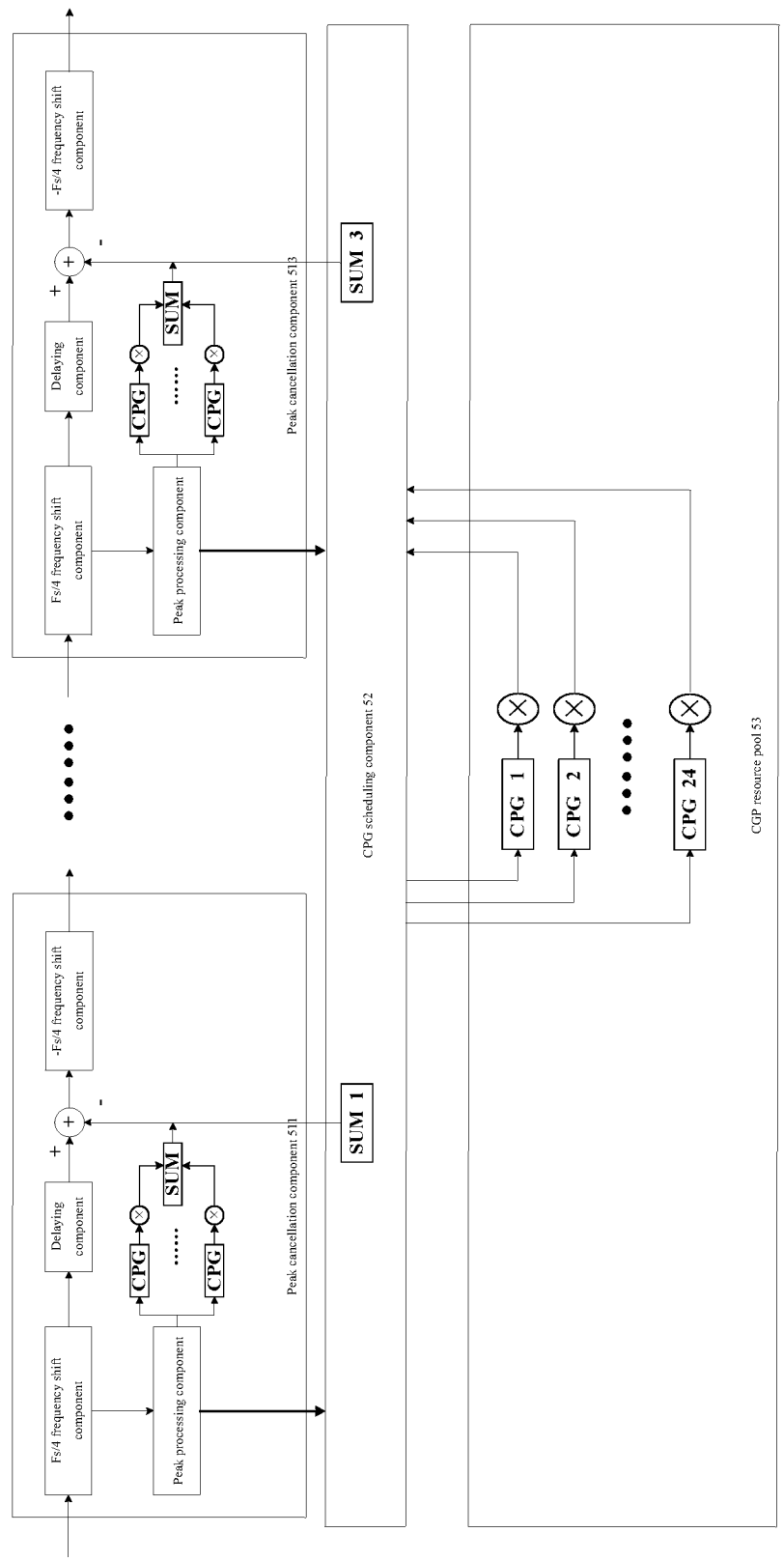
FIG. 8 is a structure diagram of a CPG scheduling system provided by a sixth embodiment of the present disclosure.
Figure 9:
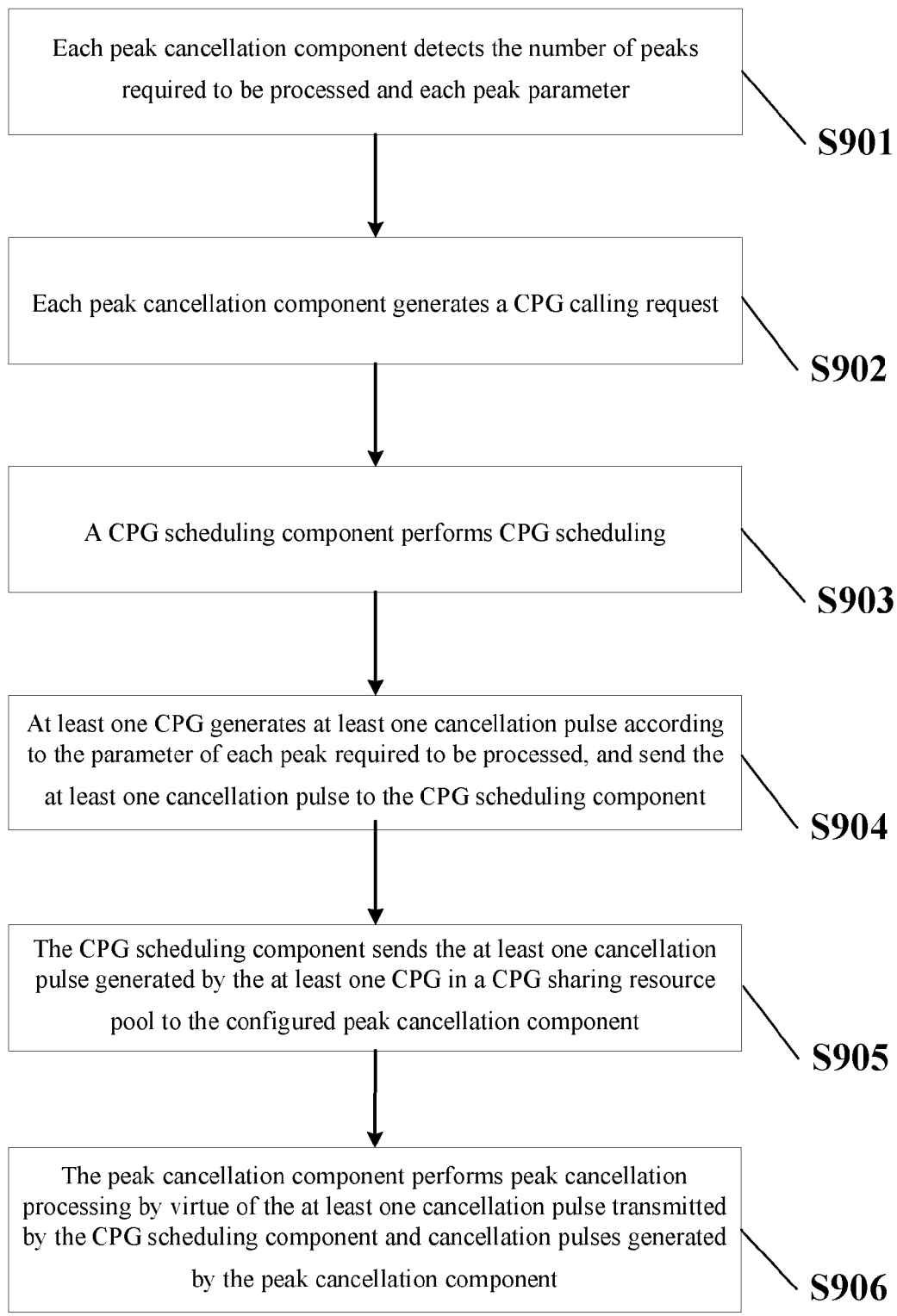
FIG. 9 is a diagram of a CPG scheduling method provided by a seventh embodiment of the present disclosure.

The present disclosure will now be further interpreted and described with reference to specific application examples. FIG. 6 is a structure diagram of a CPG scheduling system provided by a fourth embodiment of the present disclosure, FIG. 7 is a diagram of a CPG scheduling method provided by a fifth embodiment of the present disclosure, FIG. 8 is a structure diagram of a CPG scheduling system provided by a sixth embodiment of the present disclosure, and FIG. 9 is a diagram of a CPG scheduling method provided by a seventh embodiment of the present disclosure.

Figure 1:
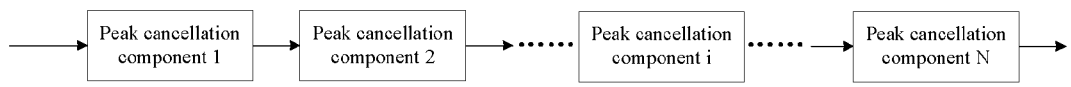
FIG. 1 is a diagram of cascading of multiple stages of peak cancellation components in the related art.
Figure 2:
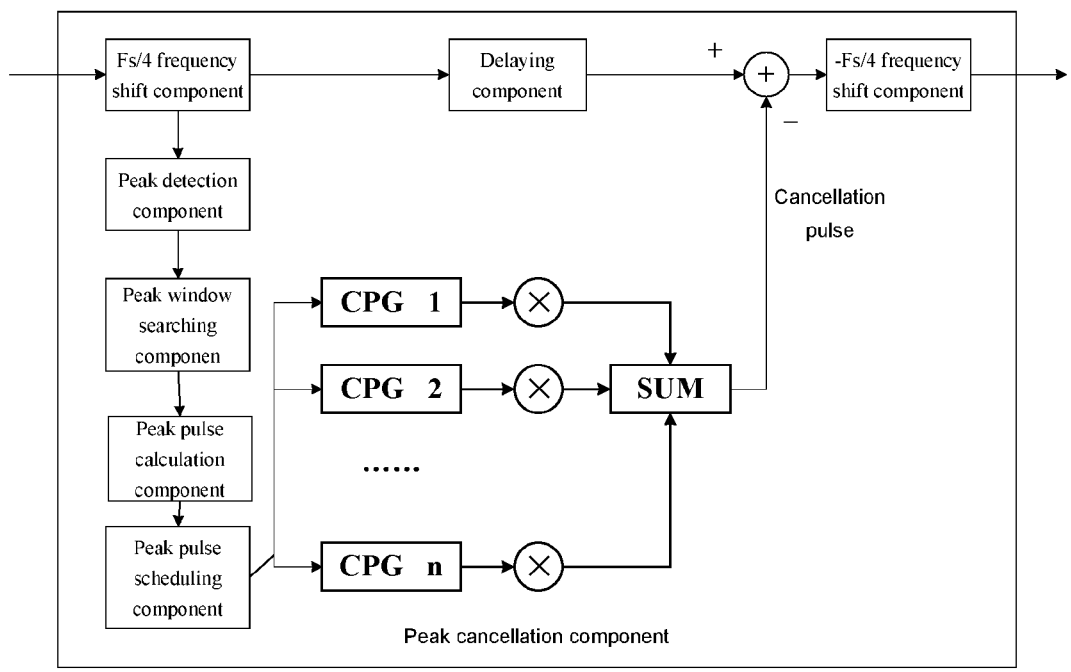
FIG. 2 is a structure diagram of the interior of a peak cancellation component of a single state in the conventional art.
Figure 7:
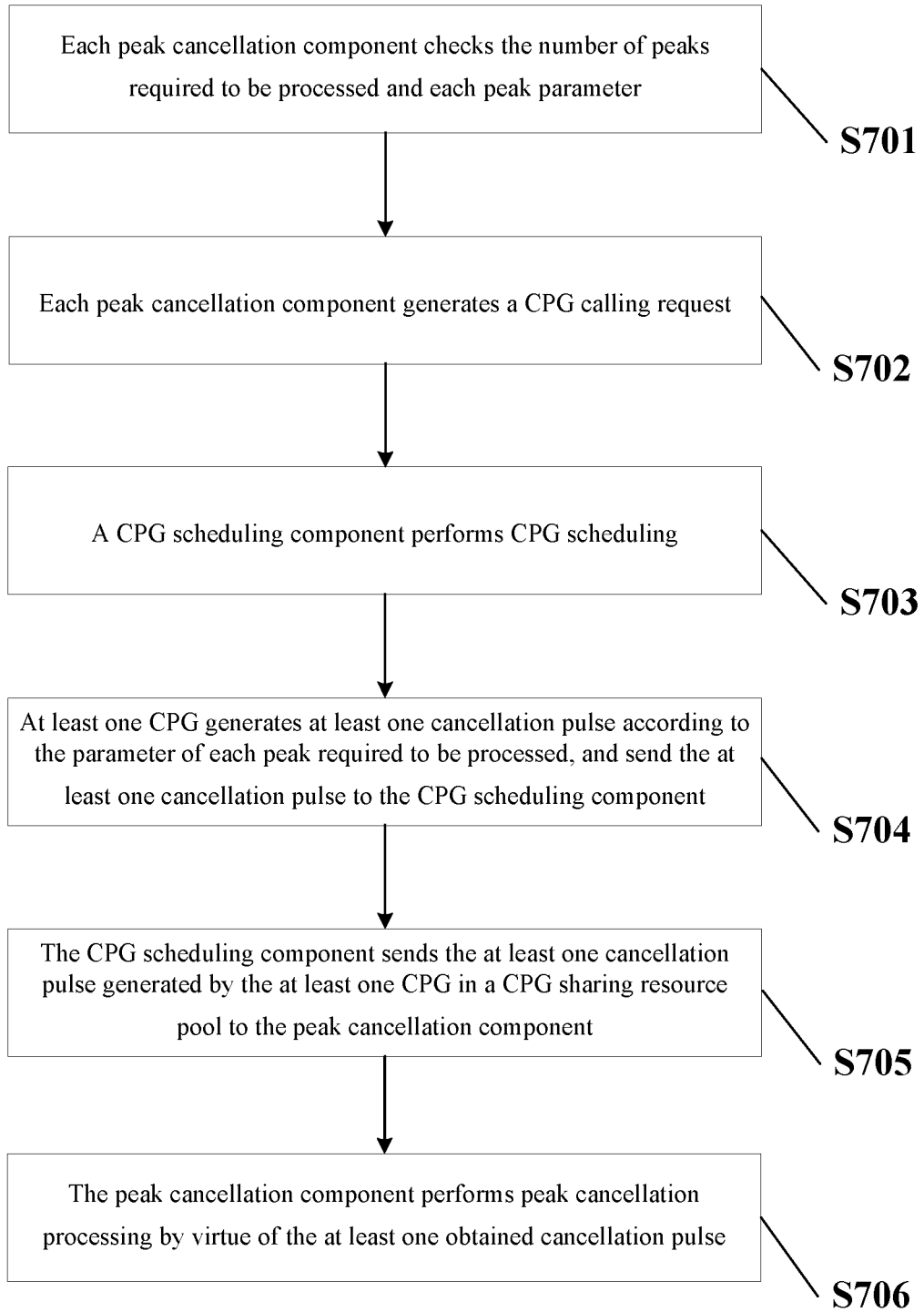
FIG. 7 is a diagram of a CPG scheduling method provided by a fifth embodiment of the present disclosure.

In an embodiment shown in FIGS. 6 and 7, it is set as follows: a CPG scheduling system 5 includes three peak cancellation components 51 (peak cancellation components 511, 512 and 513, wherein the peak cancellation component 512 is not shown), there are no CPGs set in all of the three peak cancellation components 51, scheduling priorities of the three peak cancellation components 51 are sequentially lowered, and peak processing components in the peak cancellation components 51 include peak detection components, peak window searching components, peak pulse calculation components and peak pulse scheduling components shown in FIG. 2; and a scheduling strategy in a CPG scheduling 52 is a priority scheduling strategy, there are 24 CPGs (not shown one by one in FIG. 6) in a CPG sharing resource pool 53, and as shown in FIG. 7, the CPG scheduling method provided by the embodiment includes the following steps.

Step 701: the peak processing component in each peak cancellation component checks the number of peaks required to be processed and each peak parameter, the step including that:

peak cancellation thresholds of the peak cancellation components of each stage are configured, and the peak cancellation components of each stage perform peak detection according to own peak cancellation thresholds of each stage, and perform, according to configured peak window lengths, peak window searching to obtain the number of own peaks required to be processed and each peak parameter, wherein the step may specifically include the following steps that:

Fs/4 frequency shift components perform Fs/4 frequency shift, wherein local oscillators of a frequency $f_s/4$ may be represented as follows:

$$\cos(2\pi f_c t) = \cos\left(2\pi \cdot \frac{f_s}{4} \cdot nT\right) = \cos\left(\frac{\pi}{2}n\right) \text{ and}$$

$$\sin(2\pi f_c t) = \sin\left(2\pi \cdot \frac{f_s}{4} \cdot nT\right) = \sin\left(\frac{\pi}{2}n\right),$$

during up-conversion of $f_s/4$, output is:

$n=4k$: $I_{out}=I(n)$ $Q_{out}=Q(n)$ $n=4k+1$: $I_{out}=-Q(n)$ $Q_{out}=I(n)$ $n=4k+2$: $I_{out}=-I(n)$ $Q_{out}=-Q(n)$ and $n=4k+3$: $I_{out}=Q(n)$ $Q_{out}=-I(n)$, during down-conversion of $f_s/4$, output is:

$n=4k$: $I_{out}=I(n)$ $Q_{out}=Q(n)$ $n=4k+1$: $I_{out}=Q(n)$ $Q_{out}=-I(n)$ $n=4k+2$: $I_{out}=-I(n)$ $Q_{out}=-Q(n)$ and $n=4k+3$: $I_{out}=-Q(n)$ $Q_{out}=I(n)$, and from the above calculation formulae, it may be seen that frequency shift of $f_s/4$ may be implemented only by exchanging or negating input data without a multiplier, so that resources may be saved.

The peak detection components perform peak searching, and the following four functions are mainly realized:

amplitude and phase calculation: a Cordic vector mode is adopted, and a requirement may be met by an eight-stage pipeline structure;

four-point searching: four-point comparative searching is performed on the abovementioned output at first, that is, four adjacent data are compared, it is considered that a peak appears when different slopes are determined by the first two data and the latter two data, for example, when one is a negative slope and the other is a non-negative slope, and then the medium two data are compared to find the peak; when four adjacent data are A, B, C and D respectively, it is determined that a peak exists between B and C when A<B and C≥D, it is determined that B is the peak when B≥C, otherwise it is determined that C is the peak;

comparison with a peak cancellation threshold: the found peak is compared with the peak cancellation threshold, it is determined that the peak is valid when the peak is greater than the peak cancellation threshold, otherwise it is determined that the peak is invalid; whether the peak is valid or not may be represented by an indicator signal;

processing of an amplitude of the peak: the amplitude of the peak is finally processed, that is, the peak cancellation threshold is subtracted from the amplitude of the peak to obtain a new amplitude of the peak; but phase information of the peak is kept unchanged, and for a non-peak point, the amplitude of the non-pesk point is directly set to be 0; and in addition, whether the peak is valid or not may be represented by an indicator signal.

The peak window searching components perform peak window searching to ensure that only one maximum is output in one window length.

Windowing searching is performed on a peak pulse to ensure that only one maximum is output in one window length. Since a peak cancellation processing effect may be influenced when peaks appear densely, such a secondary searching mechanism is introduced to ensure effective reduction in a peak-to-average ratio; during added window searching, movement of sliding windows has the following characteristics: it is considered that the next window begins only when a peak pulse appears after one window ends, and for a middle part without peak pulses, window counting is not started; and within a window, when a value of a current moment is greater than a temporarily-stored maximum, the temporarily-stored maximum is replaced with the current value, a counter is reset, and a window size is recalculated, that is, the window is restarted. An implementation method for added window searching will be introduced below:

the window size counter is set at first, counting of the window is started when a peak is detected, the peak is determined as an initial peak maximum in the window, when a new peak appears when the window is not completely counted, that is, when the window does not end, the peak is compared with the current peak maximum in the window, and when the current peak maximum is greater, the peak maximum in the window is replaced with the peak, and meanwhile, window counting is restarted; and on the contrary, the peak maximum in the window is kept unchanged, and a window count is continuously accumulated until the window ends. One effect of added window searching is that: the peak maximum in the window may be known only when the window ends, so that original data is required to be delayed for alignment between a valid flag of the peak maximum in the window and the peak maximum during implementation; and when the first peak in the window is the peak maximum in the window, a position of the peak maximum may be known only when the window ends, a valid flag of the maximum is generated, and then a distance between the peak maximum and the valid flag is a length of the window, so that it may be determined that a data delay clock cycle number should at least be a length value of the window.

The peak pulse calculation components obtain peak IQ data according to the amplitude and phase information of the peak.

By executing Step 701, each peak cancellation component in the present disclosure respectively calculates the number of peaks required to be processed and each peak parameter (including the peak IQ data and position information of peak pulses).

Step 702: each peak cancellation component generates a CPG calling request.

The peak processing component in each peak cancellation component generates the CPG calling request according to the number of own peaks required to be processed and each peak parameter; and for example, the peak cancellation component 511 is required to process 12 peaks, and then the generated CPG calling request carries peak parameters of the 12 peaks.

Step 703: the CPG scheduling component 52 performs CPG scheduling.

At this moment, it is supposed that there are 24 CPGs in an idle state in the CPG sharing resource pool; when the priority scheduling strategy is adopted, the following two conditions may appear:

the number of idle CPGs in the CPG sharing resource pool is greater or equal to the sum of the number of the peaks required to be processed by the three peak cancellation components:

for example, the number of the peaks required to be processed by the peak cancellation component 511 is 8, the number of the peaks required to be processed by the peak cancellation component 512 is 8 and the number of the peaks required to be processed by the peak cancellation component 513 is 4; then the CPG scheduling component 52 configures 8 CPGs for the peak cancellation component 511, configures 8 CPGs for the peak cancellation component 512 and configures 4 CPGs for the peak cancellation component 513;

for another example, the number of the peaks required to be processed by the peak cancellation component 511 is 12, the number of the peaks required to be processed by the peak cancellation component 512 is 8 and the number of the peaks required to be processed by the peak cancellation component 513 is 4; then the CPG scheduling component 52 configures 12 CPGs for the peak cancellation component 511, configures 8 CPGs for the peak cancellation component 512 and configures 4 CPGs for the peak cancellation component 513;

the number of the idle CPGs in the CPG sharing resource pool is smaller than the sum of the number of the peaks required to be processed by the three peak cancellation components: for example, the number of the peaks required to be processed by the peak cancellation component 511 is 14, the number of the peaks required to be processed by the peak cancellation component 512 is 8 and the number of the peaks required to be processed by the peak cancellation component 513 is 4; and then the CPG scheduling component 52 configures 14 CPGs for the peak cancellation component 511, configures 8 CPGs for the peak cancellation component 512 and configures 2 CPGs for the peak cancellation component 513.

Step 704: the CPGs generate cancellation pulses according to the parameters of the peaks required to be processed, and send the cancellation pulses to the CPG scheduling component.

When the CPG scheduling component configures a CPG with a serial number "1" in the CPG sharing resource pool for the peak cancellation component 511 to process a first peak required to be processed by the peak cancellation component 511, the CPG with the serial number "1" generates a cancellation pulse according to a peak parameter of the first peak carried in the CPG calling request sent by the peak cancellation component 511, specifically including that:

coefficients of the CPG with the serial number "1" are stored in a Random Access Memory, the CPG scheduling component generates a reading address of the RAM, IQ data of the first peak required to be processed by the peak cancellation component 511 is multiplied by all the coefficients of the CPG to implement CPG processing of the peak according to a data rate, and aligned addition is performed at an output end to obtain the cancellation pulse.

Step 705: the CPG scheduling component sends the cancellation pulses generated by the CPGs in the CPG sharing resource pool to the configured peak cancellation components.

For example: the CPG scheduling component configures CPGs with serial numbers "1", "2", "3", "4" and "5" to the peak cancellation component 511, and in the step, the CPG scheduling component superimposes cancellation subpulses generated by the CPGs with the serial numbers "1", "2", "3", "4" and "5" through a summation component SUM1, and sends a cancellation pulse output by SUM1 to the peak cancellation component 511.

Step 706: the peak cancellation components perform peak cancellation processing by virtue of the obtained cancellation pulses.

For example, the peak cancellation component 511 performs subtraction on the cancellation pulse sent by the CPG scheduling component and the delayed original data output by a delaying component to implement peak cancellation processing, and then outputs the processed data to the peak cancellation component of the next stage (i.e. the peak cancellation component 512) through a $-F_s/4$ frequency shift component.

In an embodiment shown in FIGS. 8 and 9, it is set as follows: the CPG scheduling system 5 includes three peak cancellation components 51 (peak cancellation components 511, 512 and 513), wherein the peak cancellation component 512 is not shown), there are 8 CPGs in all of the three peak cancellation components 51, maximum configuration number set for the three peak cancellation components 51 are sequentially 12, 10 and 8, and peak processing components in the peak cancellation components 51 include peak detection components, peak window searching components, peak pulse calculation components and peak pulse scheduling components shown in FIG. 2; and a scheduling strategy in a CPG scheduling 52 is a strategy of limiting a maximum resource configuration in a single-stage, there are 24 CPGs (not shown one by one in FIG. 8) in a CPG sharing resource pool 53, and as shown in FIG. 9, the CPG scheduling method provided by the embodiment includes the following steps.

Step 901: each peak cancellation component 51 detects the number of peaks required to be processed and each peak parameter.

The step is similar to Step 701 in FIG. 7, and will not be elaborated.

Step 902: each peak cancellation component generates a CPG calling request.

Each peak cancellation component judges whether to generate the CPG calling request or not according to the number of peaks required to be processed and the number of CPGs in the peak cancellation component, and generates the CPG calling request when the number of the peaks required to be processed are larger than the number of the CPGs in the peak cancellation components, the CPG calling request carrying information of difference between the number of the peaks required to be processed by the peak cancellation components and the number of the CPGs in the peak cancellation components and the peak parameters of each redundant peak.

For example, the peak cancellation component 511 is required to process 22 peaks, then it is necessary to generate a CPG calling request because the number of the peaks required to be processed by the peak cancellation component 511 is larger than the number of CPGs in the peak cancellation component 511, the generated CPG calling request carrying peak parameters of 14 peaks, and the peak cancellation component 511 processes the first 8 detected peaks to generate cancellation pulses through the CPGs in it according to a conventional configuration method, adds peak parameters and position information of the latter 14 peaks to the CPG calling request for transmission to the CPG scheduling component to request for 14 additional CPGs to generate cancellation pulses according to peak parameters of the 14 peaks;

for another example, the peak cancellation component 512 is required to process 8 peaks, then it is unnecessary to generate a CPG calling request because the number of the peaks required to be processed by the peak cancellation component 512 is equal to the number of CPGs in the peak cancellation component 512, and the peak cancellation component 512 processes the 8 detected peaks to generate cancellation pulses through the CPGs in it according to the conventional configuration method; and for another example, the peak cancellation component 513 is required to process 6 peaks, then it is unnecessary to generate a CPG calling request because the number of the peaks required to be processed by the peak cancellation component 513 is smaller than the number of CPGs in the peak cancellation component 513, and the peak cancellation component 513 processes the 6 detected peaks to generate cancellation pulses through the CPGs in the peak cancellation component 513.

Step 903: the CPG scheduling component 52 performs CPG scheduling.

At this moment, it is supposed that there are 24 CPGs in an idle state in the CPG sharing resource pool; when the strategy of limiting the maximum resource configuration in the single-stage is adopted, the following conditions may appear:

the number of idle CPGs in the CPG sharing resource pool is larger than or equal to the sum of the number of the peaks required to be processed by the three peak cancellation components:

for example, the number of the peaks required to be processed by the peak cancellation component 511 is 16 (that is, the CPG scheduling component is required to configure 8 additional CPGs), the number of the peaks required to be processed by the peak cancellation component 512 is 16 (that is, the CPG scheduling component is required to configure 8 additional CPGs) and the number of the peaks required to be processed by the peak cancellation component 513 is 12 (that is, the CPG scheduling component is required to configure 4 additional CPGs); then the CPG scheduling component 52 configures 8 CPGs to the peak cancellation component 511, configures 8 CPGs to the peak cancellation component 512 and configures 4 CPGs to the peak cancellation component 513;

for another example, the number of the peaks required to be processed by the peak cancellation component 511 is 22 (that is, the CPG scheduling component is required to configure 14 additional CPGs, but the CPG scheduling component sets that at most 12 CPGs may be configured to the peak cancellation component 511), the number of the peaks required to be processed by the peak cancellation component 512 is 14 (that is, the CPG scheduling component is required to configure 6 additional CPGs) and the number of the peaks required to be processed by the peak cancellation component 513 is 12 (that is, the CPG scheduling component is required to configure 4 additional CPGs); then the CPG scheduling component 52 configures 12 CPGs to the peak cancellation component 511, configures 6 CPGs to the peak cancellation component 512 and configures 4 CPGs to the peak cancellation component 513;

the number of the idle CPGs in the CPG sharing resource pool is smaller than the sum of the number of the peaks required to be processed by the three peak cancellation components: for example, the number of the peaks required to be processed by the peak cancellation component 511 is 22 (that is, the CPG scheduling component is required to configure 14 additional CPGs, but the CPG scheduling component sets that at most 12 CPGs may be configured to the peak cancellation component 511), the number of the peaks required to be processed by the peak cancellation component 512 is 16 (that is, the CPG scheduling component is required to configure 8 additional CPGs) and the number of the peaks required to be processed by the peak cancellation component 513 is 12 (that is, the CPG scheduling component is required to configure 4 additional CPGs); and then the CPG scheduling component 52 configures 12 CPGs to the peak cancellation component 511, configures 8 CPGs to the peak cancellation component 512 and configures 4 CPGs to the peak cancellation component 513.

Step 904: the CPGs generate cancellation pulses according to the parameters of the peaks required to be processed, and send the cancellation pulses to the CPG scheduling component.

The step is similar to Step 704 in the embodiment shown in FIG. 7, and will not be elaborated.

Step 905: the CPG scheduling component sends the cancellation pulses generated by the CPGs in the CPG sharing resource pool to the configured peak cancellation components.

The step is similar to Step 705 in the embodiment shown in FIG. 7, and will not be elaborated.

Step 906: the peak cancellation components perform peak cancellation processing by virtue of the cancellation pulses transmitted by the CPG scheduling component and cancellation pulses generated by the peak cancellation components.

For example, the peak cancellation component 511 is required to process 16 peaks, then the CPG scheduling component configures 8 CPGs to the peak cancellation component 511, the peak cancellation component 511 may generate 8 cancellation sub-pulses, and the 8 cancellation sub-pulses are superimposed to obtain a first cancellation pulse for output by a summation module SUM in the peak cancellation component 511; the 8 CPGs configured to the peak cancellation component 511 by the CPG scheduling component may also generate 8 cancellation sub-pulse, and the 8 cancellation sub-pulses are superimposed to obtain a second cancellation pulse for output by a summation module SUM1 configured to the peak cancellation component 511 by the CPG scheduling component 52; the peak cancellation component 511 performs subtraction on the first cancellation pulse and the second cancellation pulse and delayed original data output by a delaying component to implement peak cancellation processing, and then outputs the processed data to the peak cancellation component of the next stage (i.e. the peak cancellation component 512) through a −Fs/4 frequency shift module;

for another example, the peak cancellation component 512 is required to process 8 peaks, then the CPG scheduling component does not configure any CPG to the peak cancellation component 512, the peak cancellation component 512 may generate 8 cancellation sub-pulses, and the 8 cancellation sub-pulses are superimposed to obtain a first cancellation pulse for output by a summation component SUM in the peak cancellation component 512; and the peak cancellation component 512 performs subtraction on the first cancellation pulse and delayed original data output by a delaying module to implement peak cancellation processing, and then outputs the processed data to the peak cancellation component of the next stage (i.e. the peak cancellation component 513) through a −Fs/4 frequency shift component.

From the above, implementing the present disclosure at least has beneficial effects as follows:

first, the CPG sharing resource pool is set, and the CPG scheduling component configures the CPGs to the peak cancellation components from the CPG sharing resource pool when receiving the CPG calling requests generated by the peak cancellation components, so that requirements of the peak cancellation components on the CPGs are met, the peak cancellation components may maximally accomplish peak cancellation tasks required to be processed, and the problem of incapability in accomplishing all peak cancellation tasks of a peak cancellation component of a certain stage when the number of CPGs in the peak cancellation component is smaller than the number of peaks required to be processed by it in the related art is solved;

second, the scheduling strategy is set, different CPG scheduling is executed under different scheduling strategies, and for example, the CPGs may be preferentially configured to the peak cancellation components with a higher priority, so that the peak cancellation components with higher priorities may accomplish corresponding peak cancellation tasks required to be processed, and the CPGs may be scheduled more flexibly;

third, whether to set exclusive CPGs in the peak cancellation components or not may be selected, resource waste of the CPGs in the peak cancellation components may be avoided when not to set exclusive CPGs in the peak cancellation components, and when to set exclusive CPGs in the peak cancellation components, the number of the CPGs in the CPG sharing resource pool may be appropriately reduced, so that the CPGs may be set more flexibly by such a mechanism; and last, the flag bits are set for the CPGs in the CPG sharing resource pool, so that the phenomenon of repeated calling of the CPGs is avoided.

The above is only the specific implementation mode of the present disclosure and not intended to limit the present disclosure in any form, and any simple modification, equivalent variation, combination or embellishment made to the abovementioned implementation modes according to the technical essence of the present disclosure shall fall within the scope of protection of the technical solutions of the present disclosure.

INDUSTRIAL APPLICABILITY

By the abovementioned embodiments and preferred implementation modes, the problem of incapability in accomplishing all peak cancellation tasks of a peak cancellation component of a certain stage when the number of CPGs in the peak cancellation component is smaller than the number of peaks required to be processed by it in the conventional art is solved, and the CPGs may further be scheduled more flexibly.

What is claimed is:

1. A Cancellation Pulse Generator (CPG) scheduling method, applied to a CPG scheduling system, the CPG scheduling system comprising at least two peak cancellation components, a CPG scheduling component and a CPG sharing resource pool, the CPG sharing resource pool comprising at least one CPG, the CPG scheduling method comprising:

generating and sending, by at least one of the two peak cancellation components, a CPG calling request to the CPG scheduling component;

configuring from the CPG sharing resource pool, according to a scheduling strategy and the CPG calling request, by the CPG scheduling component, at least one CPG for the peak cancellation component corresponding to the CPG calling request, to generate at least one cancellation pulse; and receiving, by the CPG scheduling component, the at least one cancellation pulse generated by the at least one configured CPG according to the CPG calling request, and transmitting the at least one cancellation pulse to the peak cancellation component corresponding to the CPG calling request to implement peak cancellation processing, wherein when there are no CPGs set in the peak cancellation component, generating, by the peak cancellation component, the CPG calling request comprises: generating the CPG calling request according to the number of peaks required to be processed by the peak cancellation component, wherein the CPG calling request carries information of the number of the peaks required to be processed by the peak cancellation component and a peak parameter of each peak; configuring, by the CPG scheduling component, the at least one CPG for the peak cancellation component comprises: configuring the at least one CPG for the peak cancellation component, wherein the number of the at least one configured CPG is the same as the number of the peaks carried in the CPG calling request; respectively transmitting the peak parameter of each peak to each configured CPG; and generating, by the each configured CPG, the at least one cancellation pulse according to the respectively received peak parameter, when there is at least one CPG set in the peak cancellation component, generating, by the peak cancellation component, the CPG calling request comprises: judging whether to generate the CPG calling request or not according to the number of the peaks required to be processed by the peak cancellation component and the number of the CPGs already set in the peak cancellation component, and when the number of the peaks required to be processed by the peak cancellation component is larger than the number of the CPGs already set in the peak cancellation component, generating the CPG calling request, the CPG calling request comprising information of a difference between the number of the peaks required to be processed by the peak cancellation component and the number of the CPGs already set in the peak cancellation component and the peak parameter of each redundant peak corresponding to the difference; and configuring, by the CPG scheduling component, the at least one CPG for the peak cancellation component comprises: configuring the at least one CPG for the peak cancellation component, wherein the number of the at least one configured CPG is the same as the number of the difference carried in the CPG calling request; transmitting the peak parameter of each redundant peak corresponding to the difference to each configured CPG respectively; generating, by the each configured CPG, the at least one cancellation pulse according to the respectively received peak parameter; and simultaneously generating, by the CPGs already set in the peak cancellation component, at least one cancellation pulse according to the peak parameter of each remaining peak respectively.

2. The CPG scheduling method as claimed in claim 1, when the scheduling strategy is a priority scheduling strategy, before configuring, by the CPG scheduling component, the at least one CPG for the peak cancellation component corresponding to the CPG calling request, further comprising: setting, by the CPG scheduling component, a scheduling priority for each peak cancellation component, wherein configuring, by the CPG scheduling component, the at least one CPG for the peak cancellation component comprises: when two or more CPG calling requests are received, detecting the scheduling priority of each peak cancellation component, and preferentially configuring the at least one CPG for the peak cancellation component with a higher priority.

3. The CPG scheduling method as claimed in claim 2, wherein
when there are no CPGs set in the peak cancellation component, generating, by the peak cancellation component, the CPG calling request comprises: generating the CPG calling request according to the number of peaks required to be processed by the peak cancellation component, wherein the CPG calling request carries information of the number of the peaks required to be processed by the peak cancellation component and a peak parameter of each peak; configuring, by the CPG scheduling component, the at least one CPG for the peak cancellation component comprises: configuring the at least one CPG for the peak cancellation component, wherein the number of the at least one configured CPG is the same as the number of the peaks carried in the CPG calling request; respectively transmitting the peak parameter of each peak to each configured CPG; and generating, by the each configured CPG, the at least one cancellation pulse according to the respectively received peak parameter;
when there is at least one CPG set in the peak cancellation component, generating, by the peak cancellation component, the CPG calling request comprises: judging whether to generate the CPG calling request or not according to the number of the peaks required to be processed by the peak cancellation component and the number of the CPGs already set in the peak cancellation component, and when the number of the peaks required to be processed by the peak cancellation component is larger than the number of the CPGs already set in the peak cancellation component, generating the CPG calling request, the CPG calling request comprising information of a difference between the number of the peaks required to be processed by the peak cancellation component and the number of the CPGs already set in the peak cancellation component and the peak parameter of each redundant peak corresponding to the difference; and configuring, by the CPG scheduling component, the at least one CPG for the peak cancellation component comprises: configuring the at least one CPG for the peak cancellation component, wherein the number of the at least one configured CPG is the same as the number of the difference carried in the CPG calling request; transmitting the peak parameter of each redundant peak corresponding to the difference to each configured CPG respectively; generating, by the each configured CPG, the at least one cancellation pulse according to the respectively received peak parameter; and simultaneously generating, by the CPGs already set in the peak cancellation component, at least one cancellation pulse according to the peak parameter of each remaining peak respectively.

4. The CPG scheduling method as claimed in claim 1, when the scheduling strategy is a strategy of limiting a maximum resource configuration in a single-stage, before configuring, by the CPG scheduling component, the at least one CPG for the peak cancellation component corresponding to the CPG calling request, further comprising: setting, by the CPG scheduling component, a maximum configuration number for each peak cancellation component, wherein configuring, by the CPG scheduling component, the at least one CPG for the peak cancellation component comprises: when the CPG calling request is received, judging whether the number of the at least one CPG configured for the peak cancellation component corresponding to the CPG calling request reaches the maximum configuration number or not, not configuring the at least one CPG when a judging result is that the number of the at least one CPG configured for the peak cancellation component corresponding to the CPG calling request reaches the maximum configuration number, and configuring the at least one CPG when the judging result is that the number of the at least one CPG configured for the peak cancellation component corresponding to the CPG calling request does not reach the maximum configuration number.

5. The CPG scheduling method as claimed in claim 4, wherein
when there are no CPGs set in the peak cancellation component, generating, by the peak cancellation component, the CPG calling request comprises: generating the CPG calling request according to the number of peaks required to be processed by the peak cancellation component, wherein the CPG calling request carries information of the number of the peaks required to be processed by the peak cancellation component and a peak parameter of each peak; configuring, by the CPG scheduling component, the at least one CPG for the peak cancellation component comprises: configuring the at least one CPG for the peak cancellation component, wherein the number of the at least one configured CPG is the same as the number of the peaks carried in the CPG calling request; respectively transmitting the peak parameter of each peak to each configured CPG; and generating, by the each configured CPG, the at least one cancellation pulse according to the respectively received peak parameter;
when there is at least one CPG set in the peak cancellation component, generating, by the peak cancellation component, the CPG calling request comprises: judging whether to generate the CPG calling request or not according to the number of the peaks required to be processed by the peak cancellation component and the number of the CPGs already set in the peak cancellation component, and when the number of the peaks required to be processed by the peak cancellation component is larger than the number of the CPGs already set in the peak cancellation component, generating the CPG calling request, the CPG calling request comprising information of a difference between the number of the peaks required to be processed by the peak cancellation component and the number of the CPGs already set in the peak cancellation component and the peak parameter of each redundant peak corresponding to the difference; and configuring, by the CPG scheduling component, the at least one CPG for the peak cancellation component comprises: configuring the at least one CPG for the peak cancellation component, wherein the number of the at least one configured CPG is the same as the number of the difference carried in the CPG calling request; transmitting the peak parameter of each redundant peak corresponding to the difference to each configured CPG respectively; generating, by the each configured CPG, the at least one cancellation pulse according to the respectively received peak parameter; and simultaneously generating, by the CPGs already set in the peak cancellation component, at least one cancellation pulse according to the peak parameter of each remaining peak respectively.

6. The CPG scheduling method as claimed in claim 1, further comprising: setting, by the CPG scheduling component, a flag bit for each CPG in the CPG sharing resource pool, the flag bit being configured to record whether the corresponding CPG is in an idle state or not, wherein configuring, by the CPG scheduling component, the at least one CPG for the peak cancellation component comprises: searching and configuring the at least one CPG in the idle state for the peak cancellation component, and updating a state of the at least one configured CPG into a non-idle state.

7. The CPG scheduling method as claimed in claim 6, wherein
when there are no CPGs set in the peak cancellation component, generating, by the peak cancellation component, the CPG calling request comprises: generating the CPG calling request according to the number of peaks required to be processed by the peak cancellation component, wherein the CPG calling request carries information of the number of the peaks required to be processed by the peak cancellation component and a peak parameter of each peak; configuring, by the CPG scheduling component, the at least one CPG for the peak cancellation component comprises: configuring the at least one CPG for the peak cancellation component, wherein the number of the at least one configured CPG is the same as the number of the peaks carried in the CPG calling request; respectively transmitting the peak parameter of each peak to each configured CPG; and generating, by the each configured CPG, the at least one cancellation pulse according to the respectively received peak parameter;
when there is at least one CPG set in the peak cancellation component, generating, by the peak cancellation component, the CPG calling request comprises: judging whether to generate the CPG calling request or not according to the number of the peaks required to be processed by the peak cancellation component and the number of the CPGs already set in the peak cancellation component, and when the number of the peaks required to be processed by the peak cancellation component is larger than the number of the CPGs already set in the peak cancellation component, generating the CPG calling request, the CPG calling request comprising information of a difference between the number of the peaks required to be processed by the peak cancellation component and the number of the CPGs already set in the peak cancellation component and the peak parameter of each redundant peak corresponding to the difference; and configuring, by the CPG scheduling component, the at least one CPG for the peak cancellation component comprises: configuring the at least one CPG for the peak cancellation component, wherein the number of the at least one configured CPG is the same as the number of the difference carried in the CPG calling request; transmitting the peak parameter of each redundant peak corresponding to the difference to each configured CPG respectively; generating, by the each configured CPG, the at least one cancellation pulse according to the respectively received peak parameter; and simultaneously generating, by the CPGs already set in the peak cancellation component, at least one cancellation pulse according to the peak parameter of each remaining peak respectively.

8. The CPG scheduling method as claimed in claim 1, after the at least one cancellation pulse generated by the at least one configured CPG is received and before the at least one cancellation pulse is transmitted to the peak cancellation component, further comprising: synthesizing, by the CPG scheduling component, the at least one received cancellation pulse, wherein transmitting the at least one cancellation pulse to the peak cancellation component comprises: transmitting a new cancellation pulse formed by synthesis to the peak cancellation component.

9. The CPG scheduling method as claimed in claim 8, wherein
when there are no CPGs set in the peak cancellation component, generating, by the peak cancellation component, the CPG calling request comprises: generating the CPG calling request according to the number of peaks required to be processed by the peak cancellation component, wherein the CPG calling request carries information of the number of the peaks required to be processed by the peak cancellation component and a peak parameter of each peak; configuring, by the CPG scheduling component, the at least one CPG for the peak cancellation component comprises: configuring the at least one CPG for the peak cancellation component, wherein the number of the at least one configured CPG is the same as the number of the peaks carried in the CPG calling request; respectively transmitting the peak parameter of each peak to each configured CPG; and generating, by the each configured CPG, the at least one cancellation pulse according to the respectively received peak parameter;
when there is at least one CPG set in the peak cancellation component, generating, by the peak cancellation component, the CPG calling request comprises: judging whether to generate the CPG calling request or not according to the number of the peaks required to be processed by the peak cancellation component and the number of the CPGs already set in the peak cancellation component, and when the number of the peaks required to be processed by the peak cancellation component is larger than the number of the CPGs already set in the peak cancellation component, generating the CPG calling request, the CPG calling request comprising information of a difference between the number of the peaks required to be processed by the peak cancellation component and the number of the CPGs already set in the peak cancellation component and the peak parameter of each redundant peak corresponding to the difference; and configuring, by the CPG scheduling component, the at least one CPG for the peak cancellation component comprises: configuring the at least one CPG for the peak cancellation component, wherein the number of the at least one configured CPG is the same as the number of the difference carried in the CPG calling request; transmitting the peak parameter of each redundant peak corresponding to the difference to each configured CPG respectively; generating, by the each configured CPG, the at least one cancellation pulse according to the respectively received peak parameter; and simultaneously generating, by the CPGs already set in the peak cancellation component, at least one cancellation pulse according to the peak parameter of each remaining peak respectively.

10. A Cancellation Pulse Generator (CPG) scheduling system, comprising at least two peak cancellation components, a CPG scheduling component and a CPG sharing resource pool, the CPG sharing resource pool comprising at least one CPG, wherein at least one of the two peak cancellation components is configured to generate and send a CPG calling request to the CPG scheduling component;

the CPG scheduling component is configured to configure from the CPG sharing resource pool, according to a scheduling strategy and the CPG calling request, at least one CPG for the peak cancellation component corresponding to the CPG calling request to generate at least one cancellation pulse; and is further be configured to receive the at least one cancellation pulse generated by the at least one configured CPG according to the CPG calling request, and transmit the at least one cancellation pulse to the peak cancellation component corresponding to the CPG calling request to implement peak cancellation processing; and the at least one CPG in the CPG sharing resource pool is configured to generate the at least one cancellation pulse according to the CPG calling request, and transmit the at least one cancellation pulse to the CPG scheduling component, wherein the peak cancellation component is configured to, when there are no CPGs set in the peak cancellation component, and generating the CPG calling request, generate the CPG calling request according to the number of peaks required to be processed by the peak cancellation component, wherein the CPG calling request carries information of the number of the peaks required to be processed by the peak cancellation component and a peak parameter of each peak; the CPG scheduling component, when configuring the at least one CPG for the peak cancellation components, is configured to configure the at least one CPG for the peak cancellation component, wherein the number of the at least one configured CPG is the same as the number of the peaks carried in the CPG calling request; and respectively transmit the peak parameter of each peak to each configured CPG; wherein the each configured CPG generates the at least one cancellation pulse according to the respectively received peak parameter;

the peak cancellation component is configured to, when there is at least one CPG in the peak cancellation component, and generating the CPG calling request, judge whether to generate the CPG calling request or not according to the number of the peaks required to be processed by the peak cancellation component and the number of the CPGs already set in the peak cancellation component, and when the number of the peaks required to be processed by the peak cancellation component is larger than the number of the CPGs already set in the peak cancellation component, generate the CPG calling request, the CPG calling request comprising information of a difference between the number of the peaks required to be processed by the peak cancellation component and the number of the CPGs already set in the peak cancellation component and the peak parameter of each redundant peak corresponding to the difference; and the CPG scheduling component, when configuring the at least one CPG for the peak cancellation component, is configured to configure the at least one CPG for the peak cancellation component, wherein the number of the at least one configured CPG is the same as the number of the difference carried in the CPG calling request, and transmit the peak parameter of each redundant peak corresponding to the difference to each configured CPG respectively; wherein the each configured CPG generates the at least one cancellation pulse according to the respectively received peak parameter, and the CPGs set in the peak cancellation component simultaneously generate at least one cancellation pulse according to the peak parameter of each remaining peak respectively.

11. The CPG scheduling system as claimed in claim 10, wherein, the CPG scheduling component is further configured to, when the scheduling strategy is a priority scheduling strategy, before configuring the at least one CPG for the peak cancellation component corresponding to the CPG calling request, set a scheduling priority for each peak cancellation component; and the CPG scheduling component is configured to, when configuring the at least one CPG for the peak cancellation component, and receiving two or more CPG calling requests, detect the scheduling priority of each peak cancellation component, and preferentially configure the at least one CPG for the peak cancellation component with a higher priority.

12. The CPG scheduling system as claimed in claim 11, wherein the peak cancellation component is configured to, when there are no CPGs set in the peak cancellation component, and generating the CPG calling request, generate the CPG calling request according to the number of peaks required to be processed by the peak cancellation component, wherein the CPG calling request carries information of the number of the peaks required to be processed by the peak cancellation component and a peak parameter of each peak; the CPG scheduling component, when configuring the at least one CPG for the peak cancellation components, is configured to configure the at least one CPG for the peak cancellation component, wherein the number of the at least one configured CPG is the same as the number of the peaks carried in the CPG calling request; and respectively transmit the peak parameter of each peak to each configured CPG; wherein the each configured CPG generates the at least one cancellation pulse according to the respectively received peak parameter;

the peak cancellation component is configured to, when there is at least one CPG in the peak cancellation component, and generating the CPG calling request, judge whether to generate the CPG calling request or not according to the number of the peaks required to be processed by the peak cancellation component and the number of the CPGs already set in the peak cancellation component, and when the number of the peaks required to be processed by the peak cancellation component is larger than the number of the CPGs already set in the peak cancellation component, generate the CPG calling request, the CPG calling request comprising information of a difference between the number of the peaks required to be processed by the peak cancellation component and the number of the CPGs already set in the peak cancellation component and the peak parameter of each redundant peak corresponding to the difference; and the CPG scheduling component, when configuring the at least one CPG for the peak cancellation component, is configured to configure the at least one CPG for the peak cancellation component, wherein the number of the at least one configured CPG is the same as the number of the difference carried in the CPG calling request, and transmit the peak parameter of each redundant peak corresponding to the difference to each configured CPG respectively; wherein the each configured CPG generates the at least one cancellation pulse according to the respectively received peak parameter, and the CPGs set in the peak cancellation component simultaneously generate at least one cancellation pulse according to the peak parameter of each remaining peak respectively.

13. The CPG scheduling system as claimed in claim 10, wherein, the CPG scheduling component is further configured to, when the scheduling strategy is a strategy of limiting a maximum resource configuration in a single-stage, before configuring the at least one CPG for the peak cancellation component corresponding to the CPG calling request, set a maximum configuration number for each peak cancellation component; and the CPG scheduling component is configured to, when configuring the at least one CPG for the peak cancellation component, and receiving the CPG calling request, judge whether the number of the at least one CPG configured for the peak cancellation component corresponding to the CPG calling request reaches the maximum configuration number or not, not configure the at least one CPGs when a judging result is that the number of the at least one CPG configured for the peak cancellation component corresponding to the CPG calling request reaches the maximum configuration number, and configure the at least one CPG when the judging result is that the number of the at least one CPG configured for the peak cancellation component corresponding to the CPG calling request does not reach the maximum configuration number.

14. The CPG scheduling system as claimed in claim 13, wherein
the peak cancellation component is configured to, when there are no CPGs set in the peak cancellation component, and generating the CPG calling request, generate the CPG calling request according to the number of peaks required to be processed by the peak cancellation component, wherein the CPG calling request carries information of the number of the peaks required to be processed by the peak cancellation component and a peak parameter of each peak; the CPG scheduling component, when configuring the at least one CPG for the peak cancellation components, is configured to configure the at least one CPG for the peak cancellation component, wherein the number of the at least one configured CPG is the same as the number of the peaks carried in the CPG calling request; and respectively transmit the peak parameter of each peak to each configured CPG; wherein the each configured CPG generates the at least one cancellation pulse according to the respectively received peak parameter;

the peak cancellation component is configured to, when there is at least one CPG in the peak cancellation component, and generating the CPG calling request, judge whether to generate the CPG calling request or not according to the number of the peaks required to be processed by the peak cancellation component and the number of the CPGs already set in the peak cancellation component, and when the number of the peaks required to be processed by the peak cancellation component is larger than the number of the CPGs already set in the peak cancellation component, generate the CPG calling request, the CPG calling request comprising information of a difference between the number of the peaks required to be processed by the peak cancellation component and the number of the CPGs already set in the peak cancellation component and the peak parameter of each redundant peak corresponding to the difference; and the CPG scheduling component, when configuring the at least one CPG for the peak cancellation component, is configured to configure the at least one CPG for the peak cancellation component, wherein the number of the at least one configured CPG is the same as the number of the difference carried in the CPG calling request, and transmit the peak parameter of each redundant peak corresponding to the difference to each configured CPG respectively; wherein the each configured CPG generates the at least one cancellation pulse according to the respectively received peak parameter, and the CPGs set in the peak cancellation component simultaneously generate at least one cancellation pulse according to the peak parameter of each remaining peak respectively.

15. The CPG scheduling system as claimed in claim 10, wherein the CPG scheduling component is further configured to set a flag bit for each CPG in the CPG sharing resource pool, the flag bit being configured to record whether the corresponding CPG is in an idle state or not; and the CPG scheduling component is configured to, when configuring the at least one CPG for the peak cancellation component, search and configure the at least one CPG in the idle state for the peak cancellation component, and update a state of the at least one configured CPG into a non-idle state.

16. The CPG scheduling system as claimed in claim 15, wherein
the peak cancellation component is configured to, when there are no CPGs set in the peak cancellation component, and generating the CPG calling request, generate the CPG calling request according to the number of peaks required to be processed by the peak cancellation component, wherein the CPG calling request carries information of the number of the peaks required to be processed by the peak cancellation component and a peak parameter of each peak; the CPG scheduling component, when configuring the at least one CPG for the peak cancellation components, is configured to configure the at least one CPG for the peak cancellation component, wherein the number of the at least one configured CPG is the same as the number of the peaks carried in the CPG calling request; and respectively transmit the peak parameter of each peak to each configured CPG; wherein the each configured CPG generates the at least one cancellation pulse according to the respectively received peak parameter;

the peak cancellation component is configured to, when there is at least one CPG in the peak cancellation component, and generating the CPG calling request, judge whether to generate the CPG calling request or not according to the number of the peaks required to be processed by the peak cancellation component and the number of the CPGs already set in the peak cancellation component, and when the number of the peaks required to be processed by the peak cancellation component is larger than the number of the CPGs already set in the peak cancellation component, generate the CPG calling request, the CPG calling request comprising information of a difference between the number of the peaks required to be processed by the peak cancellation component and the number of the CPGs already set in the peak cancellation component and the peak parameter of each redundant peak corresponding to the difference; and the CPG scheduling component, when configuring the at least one CPG for the peak cancellation component, is configured to configure the at least one CPG for the peak cancellation component, wherein the number of the at least one configured CPG is the same as the number of the difference carried in the CPG calling request, and transmit the peak parameter of each redundant peak corresponding to the difference to each configured CPG respectively; wherein the each configured CPG generates the at least one cancellation pulse according to the respectively received peak parameter, and the CPGs set in the peak cancellation component simultaneously generate at least one cancellation pulse according to the peak parameter of each remaining peak respectively.

17. The CPG scheduling system as claimed in claim 10, wherein, the CPG scheduling component is further configured to, after receiving the at least one cancellation pulse generated by the at least one configured CPGs and before transmitting the at least one cancellation pulses to the peak cancellation component, synthesize the at least one received cancellation pulse; and the CPG scheduling component is configured to, when transmitting the at least one cancellation pulse to the peak cancellation component, transmit a new cancellation pulse formed by synthesis to the peak cancellation component.

18. The CPG scheduling system as claimed in claim 17, wherein the peak cancellation component is configured to, when there are no CPGs set in the peak cancellation component, and generating the CPG calling request, generate the CPG calling request according to the number of peaks required to be processed by the peak cancellation component, wherein the CPG calling request carries information of the number of the peaks required to be processed by the peak cancellation component and a peak parameter of each peak; the CPG scheduling component, when configuring the at least one CPG for the peak cancellation components, is configured to configure the at least one CPG for the peak cancellation component, wherein the number of the at least one configured CPG is the same as the number of the peaks carried in the CPG calling request; and respectively transmit the peak parameter of each peak to each configured CPG; wherein the each configured CPG generates the at least one cancellation pulse according to the respectively received peak parameter;

the peak cancellation component is configured to, when there is at least one CPG in the peak cancellation component, and generating the CPG calling request, judge whether to generate the CPG calling request or not according to the number of the peaks required to be processed by the peak cancellation component and the number of the CPGs already set in the peak cancellation component, and when the number of the peaks required to be processed by the peak cancellation component is larger than the number of the CPGs already set in the peak cancellation component, generate the CPG calling request, the CPG calling request comprising information of a difference between the number of the peaks required to be processed by the peak cancellation component and the number of the CPGs already set in the peak cancellation component and the peak parameter of each redundant peak corresponding to the difference; and the CPG scheduling component, when configuring the at least one CPG for the peak cancellation component, is configured to configure the at least one CPG for the peak cancellation component, wherein the number of the at least one configured CPG is the same as the number of the difference carried in the CPG calling request, and transmit the peak parameter of each redundant peak corresponding to the difference to each configured CPG respectively; wherein the each configured CPG generates the at least one cancellation pulse according to the respectively received peak parameter, and the CPGs set in the peak cancellation component simultaneously generate at least one cancellation pulse according to the peak parameter of each remaining peak respectively.

* * * * *